INVENTOR.
JOHN A. TOURTELLOTT
BY
W. H. Spouagle
ATTORNEY

INVENTOR.
JOHN A. TOURTELLOTT
BY
W. H. Spoungle
ATTORNEY

United States Patent Office 3,225,146

Patented Dec. 21, 1965

3,225,146

STEREOPHONIC PHONOGRAPH SYSTEM

John A. Tourtellot, Merchantville, N.J., assignor to Radio Corporation of America, a corporation of Delaware Filed Mar. 14, 1958, Ser. No. 721,474
28 Claims. (Cl. 179—100.4)

This invention relates to phonograph systems and more particularly to phonograph systems for reproducing records of the type having two stereophonically related recordings to the same record groove.

Phonograph records have heretofore been proposed which have two stereophonically related selections recorded in the same record groove. By way of example, the two recordings may be cut at right angles to each other in the same record groove, with each being at an angle of 45° with respect to the record surface. Such records will be hereinafter referred to as 45—45 records. With a record of this type the groove undulations are of a complex nature, with each of the two recordings having both lateral undulation components and vertical undulation components.

One problem encountered in phonograph systems in general, is that low frequency noise referred to as "rumble" is superimposed on the low frequency signals transduced from the phonograph record. Rumble is caused by vertical vibrations due to the turntable bearings, the turntable motor and driving assembly and the like. In conventional laterally cut records having only a single recording in the record groove, rumble can be reduced by proper record player design and by designing the mechanical elements of the phonograph pickup to be substantially unresponsive to vertical vibrations. However, in stereophonic phonograph systems of the type referred to, the pickup must be responsive to both vertical and lateral record groove undulations, and since both recordings include vertical undulation components the susceptibility of the system to rumble is increased.

Another problem is that in recording signal information by vertical undulations in a record groove, the distortion products increase with frequency as well as amplitude. Since both recordings include vertical undulation components, the high frequency distortion products therefrom may seriously degrade the performance characteristics of the system.

Accordingly, it is an object of this invention to provide an improved stereophonic phonograph system.

A further object of this invention is to provide improved circuits for stereophonic phonograph systems of the type referred to wherein the responsive to vertical rumble is materially reduced.

Another object of this invention is to provide an improved stereophonic phonograph system of the type referred to wherein the effects of high frequency distortion products of the vertical record undulations are materially reduced.

Another object of this invention is to provide an improved stereophonic phonograph system for use with records having two stereophonically related recordings cut in the same record groove with each being at substantially the same angle with respect to the record surface wherein the frequency response of the vertical undulation components of each of said recordings may be controlled independently of the lateral undulation components and vice versa.

A still further object of this invention is to provide an improved stereophonic phonograph recording system wherein the low frequency or high frequency vertical signal components or both, may be attenuated to reduce the stylus tracking difficulties and high frequency distortion products encountered in a phonograph reproducing system.

In accordance with the invention, a pair of signals corresponding to two stereophonically related recordings are combined in an electrical network. The network is designed so that electrical signals resulting from either of the lateral or vertical undulation components in the record groove may be controlled to the exclusion of the other. In this manner, by attenuating the low frequency or high frequency vertical signal components the response of a stereophonic phonograph reproducing system to the effects of rumble or high frequency distortion respectively may be materially reduced. As applied to a stereophonic recording system, the attenuation of the low frequency or high frequency vertical signal components during the recording process reduces the stylus tracking difficulties and high frequency distortion products respectively encountered in stereophonic phonograph reproducing systems.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings in which:

Figures 1, 2, 3, 4, 5, 6:
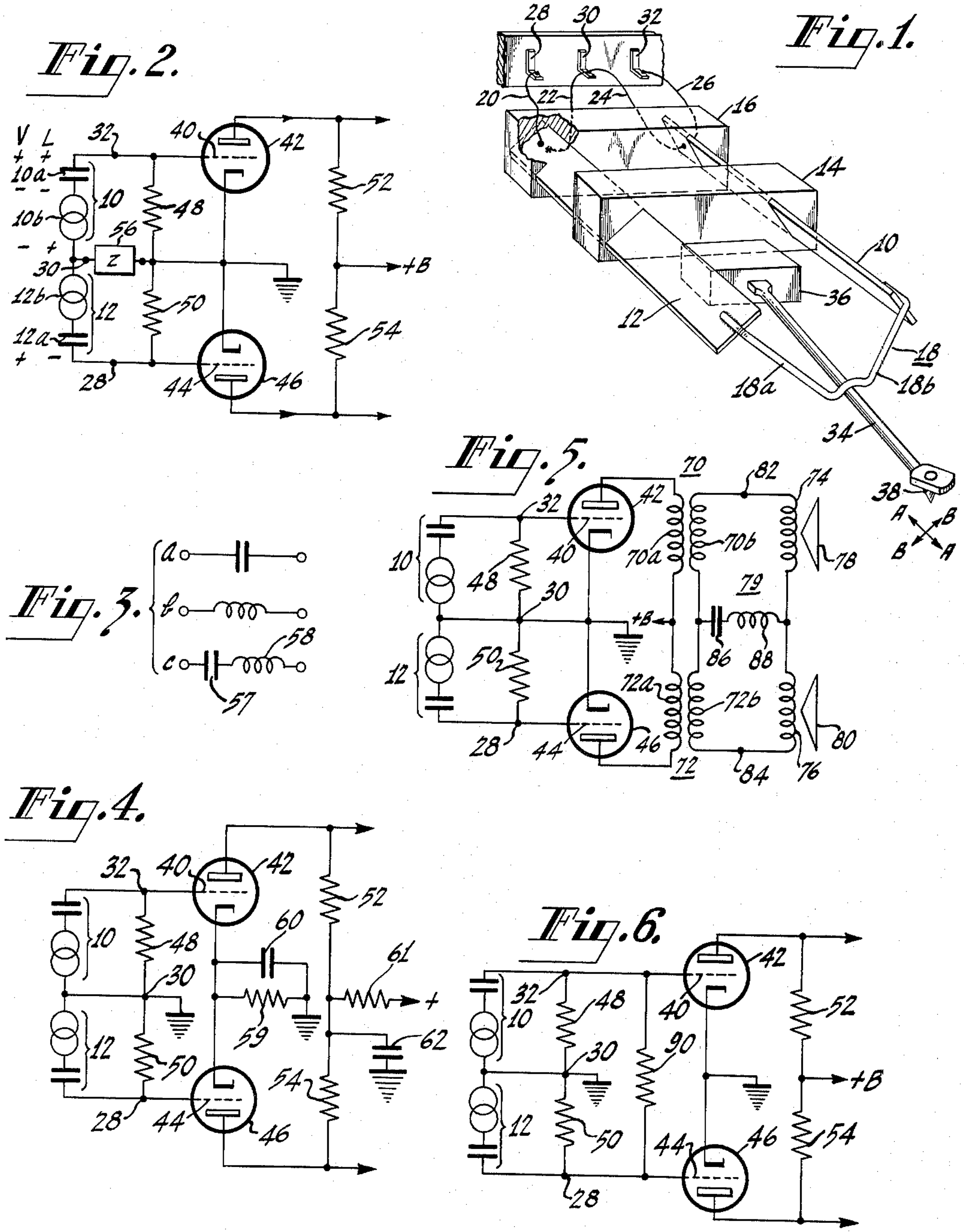
FIGURE 1 is a perspective view of a phonograph pickup for reproducing the recordings of a 45—45 stereophonic phonograph record.
FIGURE 2 is a schematic circuit diagram showing a portion of the stereophonic phonograph system including an electrical network embodying the invention.
Figure 7:
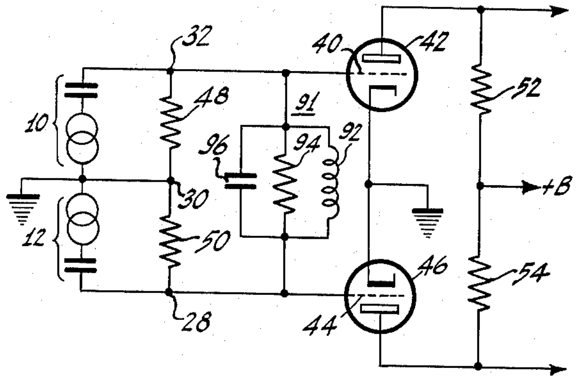
Figure 8:
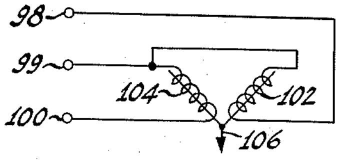

FIGURES 3*a*, 3*b* and 3*c* are schematic diagrams of frequency responsive impedance networks which may be substituted in the circuit of FIGURE 2;

FIGURE 4 is a schematic circuit diagram of an amplifier stage for a stereophonic phonograph system illustrating another embodiment of the invention;

FIGURE 5 is a schematic circuit diagram of an amplifier and sound reproducing network for stereophonic phonograph systems illustrating still another embodiment of the invention;

FIGURE 6 is a schematic circuit diagram of a network for coupling a stereophonic pickup for 45—45 records to an amplifier system in accordance with the invention;

FIGURE 7 is a schematic circuit diagram illustrating a modification of the circuit of FIGURE 6 in accordance with the invention; and FIGURE 8 is a schematic circuit diagram of a stereophonic recording apparatus for 45—45 records which may be connected for operation with the circuits of FIGURES 2, 4, 5, 6 and 7.

Reference is now made to the drawings wherein like reference characters will be used to designate similar elements throughout. FIGURE 1 of the drawings shows the operating elements of a stereophonic phonograph pickup cartridge for reproducing the two recordings of a 45—45 record. The pickup cartridge casing which normally encloses these elements has not been shown to better illustrate the pickup operation. As is conventional, the pickup cartridge is normally mounted near the free end of a pivotally movable tone arm for transverse movement across the surface of a phonograph record.

The operating elements of the stereophonic pickup include a pair of elongated piezoelectric transducing elements 10 and 12 of rectangular cross-section. These transducing elements are supported by a pair of spaced damping blocks 14 and 16 of resilient material which have openings cut or otherwise formed therein for receiving and accurately positioning the transducing elements 10 and 12 with respect to each other. In order that the transducing elements 10 and 12 are accurately positioned with respect to the cartridge casing (not shown), the dimensions of the damping blocks 14 and 16 may be made slightly greater than the cavity formed within the cartridge casing so that sufficient pressure is provided through the damping blocks 14 and 16 to anchor the transducing elements 10 and 12 securely in position.

The openings in the damping blocks 14 and 16 are cut so that the major surfaces of the transducing elements 10 and 12 lie in perpendicular planes, with each plane disposed at an angle of 45° to a plane extending vertically through the longitudinal axis of the pickup device. The free ends of the transducing elements 10 and 12, which are arranged and polarized to produce a voltage in response to a bending stress, are driven by a yoke member 18 which is formed of a single piece of wire to have a pair of divergent legs and a reentrant central portion. The yoke member 18 could as well be formed of a plastic material of generally the same shape such as viscoloid. The legs of the yoke member are constructed of a dimension and material to be relatively stiff axially but flexible in all directions perpendicular to the axis thereof. As shown in the drawings, the yoke member lies in a plane perpendicular to the longitudinal axis of the transducing elements 10 and 12 with each of the divergent legs thereof being normal to the particular transducing element to which it is affixed. Thus, the components of force applied to the yoke member 18, which are parallel to the axis of the respective legs will be readily transmitted to the transducing elements 10 and 12 to cause bending thereof.

Electrical connections are provided to the transducing elements 10 and 12 by the conductors 20, 22, 24 and 26 which are connected between the terminals 28, 30 and 32 and electrodes on the opposite sides of the two transducing elements 10 and 12. The terminal 30 serves as a common terminal for both of the transducing elements. Thus, electrical signals corresponding to one of the separable recordings of a 45—45 record may be derived from the terminals 28 and 30 and electrical signals corresponding to the other recording may be derived from the terminals 30 and 32.

The stylus assembly for the pickup comprises a stylus arm 34, one end of which is embedded in a block of resilient material 36 to urge the stylus arm 34 into engagement with the reentrant portion of the yoke member 18. A stylus member 38, which is adapted to scan a record groove, is supported at the free end of the stylus arm 34.

In a 45—45 record, one of the recordings is cut in a direction indicated by the arrows A—A, and the other in a direction indicated by the arrows B—B. These recordings are ordinarily at right angles to each other with each being at an angle of 45° with respect to the record surface. The stylus member 38 in following the undulations of a groove having only the channel A—A recording would move back and forth along a line generally coincident with the axis of the leg 18*a* which is affixed to the transducing element 12. Since the leg 18*a* is stiff axially, these vibrations will be directed through the stylus arm 34 and the leg 18*a* to the transducing element 12 causing an electrical signal to be generated by this element. At the same time, this motion is generally in a plane perpendicular to the axis of the leg 18*b* of the yoke member 18 which is affixed to the transducing element 10. Since the leg 18*b* is flexible in directions perpendicular to the axis thereof as mentioned above, the leg 18*b* flexes back and forth with the motion of the stylus arm 34 and causes substantially no bending of the transducing element 10, thereby producing no electrical output signal from this transducing element.

The same action occurs for recordings cut at an angle indicated by the arrows B—B except that the vibrations are readily transmitted to the transducing element 10 causing electrical signals to be produced in response thereto, with negligible effect on the transducing element 12. Naturally, with recordings in both channels, the movement of the stylus arm 34 is complex causing motion which has components that produce bending of both the transducing elements 10 and 12. For example, if like in-phase signals are simultaneously recorded in channels A and B, the net effect will be to move the stylus arm 34 up and down in a vertical plane. This produces equal axial components of action which are directed along the legs 18*a* and 18*b* of the yoke member 18 so that equal bending of the transducing elements 10 and 12 occurs, and accordingly corresponding in-phase signals of equal amplitude will be derived from the upper electrodes of the two transducing elements with respect to the lower electrodes thereof.

If the two signals recorded in channels A and B are recorded at 180° out-of-phase, then the net effect is to move the stylus arm 34 laterally. This produces equal and opposite components in legs 18*a* and 18*b* causing one of the transducing elements to bend up as the other bends down. Accordingly, equal signals 180° out-of-phase will be derived from the upper electrodes of the two transducing elements with respect to the lower electrodes thereof. Naturally, if the connections from one of the transducing elements to the terminals is reversed, the phasing of the signals at the terminals 28, 30 and 32 will be such that lateral and undulations produce corresponding in-phase signals of equal amplitude and vertical undulations produce equal signals 180° out-of-phase.

Referring now to FIGURE 2, the transducing elements 10 and 12 are shown in equivalent form. For piezoelectric crystals, such as barium-titanate ceramic elements, the transducers generally are capacitive and are the equivalent of a capacitor in series with a signal generator. Thus the equivalent circuit for the transducing element 10 comprises a capacitor 10*a* and a signal generator 10*b* in series, and the transducing element 12 appears as a capacitor 12*a* in series with a signal generator 12*b*. One electrode of each of the transducing elements 10 and 12 is connected to the common terminal 30, and the other electrode of these transducers are connected to the terminals 32 and 28 respectively. The connections to the transducing elements 10 and 12 may be assumed to be the same as that shown in FIGURE 1 so that lateral motion of the pickup stylus 38 produces push-pull electrical signals (180° out-of-phase) at the terminals 28 and 32. In other words, when the terminal 28 is going positive the terminal 32 is going negative and vice versa. From a consideration of the stereophonic pickup structure of FIGURE 1, it will be seen that under these conditions, vertical movement of the pickup stylus causes both of the terminals 28 and 32 to go either positive or negative at the same time.

The terminal 32 is coupled to the input electrode 40 of an amplifying device such as an electron tube 42 and the terminal 28 is connected with the input electrode 44 of a second amplifying device such as an electron tube 46. A pair of impedance elements such as the resistors 48 and 50 which may be of equal resistance value are serially connected between the input electrodes 40 and 44. The junction of the resistors 48 and 50 is connected with the common electrodes of the tubes 42 and 46 which are at ground potential for the amplifiers, and an amplified output signal may be derived from the load resistors 52 and 54 which are respectively connected between the +B operating potential terminal and the output electrodes of the tubes 42 and 46. Signals developed across the resistors 52 and 54 may be applied to suitable utilization means (not shown) such as a loudspeaker, or an amplifier, for further amplification.

As shown in FIGURE 2, the common terminal 30 of the two transducing elements 10 and 12 is connected through a frequency responsive impedance means 56 to the junction of the resistors 48 and 50. If the impedance means 56 has zero impedance, the signal output from the transducing elements 10 and 12 will be separately amplified in a normal manner by the amplifiers 42 and 46 respectively. However, if the impedance means 56 is an open circuit, electrical signals resulting from vertical record groove undulations, hereinafter referred to as vertical signal components, will not be amplified. This is because the vertical signal components produce the same potential on the input electrodes 40 and 44, and therefore, no current flows through the resistors 48 and 50. Thus, there is no difference in potential between the input electrodes and common electrodes of the respective amplifier tubes to be amplified. On the other hand, electrical signals resulting from lateral groove undulations, hereinafter referred to as the lateral signal components causes the input electrode 40 to go positive while the input electrode 44 is going negative or vice versa, thereby producing a difference in potential across the resistors 48 and 50 which may be amplified through the tubes 42 and 46.

From the foregoing it will be seen that the signal path for the vertical signal components produced by the transducing element 10 includes the resistor 48 in series with the impedance means 56, whereas the signal path for the vertical signal components from the transducing element 12 includes the resistor 50 in series with the impedance means 56. Since the impedance means 56 does not affect the lateral signal components, it can be effectively utilized to control the response of the stereophonic phonograph system to vertical signal components resulting from the vertical undulations of the 45—45 phonograph record. Thus, if the impedance means 56 comprises a capacitor as shown in FIGURE 3*a*, the low frequency vertical signal components will be attenuated. The capacitor of FIGURE 3*a* may be selected in accordance with well known design principles to obtain the desired degree of attenuation near the low end of the audio range. In this manner low frequency rumble which results from vertical vibrations due to the phonograph drive system, turntable mounting etc., may be minimized without affecting the low frequency signals produced as a result of the lateral undulation components of the record.

If desired, the impedance means 56 may comprise an inductor such as shown in FIGURE 3*b*. An inductor, as is well known, provides a greater impedance to higher frequencies than to lower frequencies. Thus, the inductor attenuates the higher frequency vertical signal components produced by the transducing elements 10 and 12 to minimize the distortion products produced in the recording of the vertical signal.

Still further, the impedance means 56 may comprise, as shown in FIGURE 3*c*, a series capacitor 57, and an inductor 58 for attenuating both the high and low frequency vertical signals while leaving the mid-range performance relatively unaffected. If desired, the series capacitor 57 and inductor 58 may be damped by a resistor (not shown) to modify the impedance vs. frequency characteristic of the circuit. Naturally, other frequency responsive networks may suggest themselves to persons skilled in the art for use with the stereophonic phonograph system of the invention without departing from the scope of the invention.

A stereophonic phonograph system using a pickup of the type described may be used to play records having only a single recording in the record groove. Most records currently in use have lateral groove undulations representative of the recorded signal. As explained above for lateral stylus motion, signal outputs are produced from both of the stereophonic pickup transducing elements. Most efficient use of the stereophonic amplifying system for single recording or monaural records is made if the lateral signals are applied to the amplifiers 42 and 46 in push-pull relation. With the amplifiers thus operating in push-pull relation, second harmonic distortion may be reduced, and increased power amplification efficiency of the lateral signal may be obtained.

FIGURE 4 shows a further embodiment of the stereophonic phonograph system of the invention similar to that shown in FIGURE 2 except that the impedance means 56 of FIGURE 2 has been replaced by a direct connection and the amplifier tubes 42 and 46 are provided with a common cathode resistor 59 which is partially bypassed for signal frequencies by a capacitor 60. The amplified lateral signal components from the amplifiers 42 and 46 are developed across a pair of load resistors 52 and 54, whereas the vertical signal components are developed across the resistors 52 and 54 together with the resistor 61.

It will be noted that for lateral signal components the input electrode 40 moves in a positive direction as the input electrode 44 moves in a negative direction. This causes the tube 42 to draw more current at the same time the tube 46 is drawing less current. These effects balance out and produce relatively little change of current through the cathode resistor 59. However, as mentioned above in connection with FIGURE 2, the vertical signal components from the two transducers go in the same polarity direction at the same time, and cause the tubes 42 and 46 to draw more or less current at the same time. Thus the only change in current through the cathode resistor 59 is due to the vertical signals produced by the transducing elements 10 and 12.

Accordingly, the low frequency response of the stereophonic phonograph system to vertical signal components, including undesired rumble, may be reduced by providing the capacitor 60 in parallel with the resistor 59. The impedance of the capacitor is selected to be such that sufficient impedance is presented to signals of a frequency corresponding to that of rumble or other low frequency noise to prevent substantial bypassing of these signals, and yet present a much lower impedance to signals of higher frequency. Under these conditions the resistor 59 is substantially unbypassed for low frequency signals and considerable degeneration results, thereby limiting the low frequency gain through the amplifier tubes 42 and 46 and thus attenuating the low frequency vertical signal components relative to the higher frequency vertical signal components.

The currents through the load resistors 52 and 54 are passed through a common resistor 61 to the B+ supply, and the junction of the load resistors 52 and 54 is partially bypassed to ground by a capacitor 62. Since the current increases in one of the tubes and decreases in the other for lateral signal components the net change of current through the resistor 61 is substantially zero. However there is a current change through the resistor 61 due to the vertical signal components. Thus, the high frequency response for these vertical signal components is attenuated by the capacitor 62 to reduce the distortion effects produced by the high frequency vertical signal components.

If desired, an inductor may be substituted for the capacitor 60 in the common cathode circuit to provide attenuation of the hgiher frequency vertical signals, or alternatively an inductor may be inserted in series with the capacitor 60 as shown in FIGURE 3*c* of the drawings to cause attenuation for both high and low frequency vertical signal components relative to the mid range components.

In the stereophonic phonograph system shown in FIGURE 5, the pickup transducing elements 10 and 12 are connected in the same manner as indicated above for FIGURES 2 and 4. The amplifier tubes 42 and 46 are connected to an output circuit comprising a pair of output transformers 70 and 72. Signals developed across the primary winding 70*a* of the transformer 70 are coupled to the secondary winding 70*b*, and in like manner signals developed across the primary 72*a* are coupled to the secondary winding 72*b*. One terminal of each of the windings 70*b* and 72*b* are connected together, and these windings are connected to form a loop circuit with a pair of serially connected windings 74 and 76 of a pair of loudspeakers 78 and 80. The junction of the loudspeaker windings 74 and 76 are connected through a frequency responsive impedance means 79 to the junction of the secondary windings 70*b* and 72*b*.

Since the lateral signal components are in push-pull, the upper terminal 82 goes in a positive direction as a lower terminal 84 goes in a negative direction or vice versa. Thus, a difference of potential exists between the terminals 82 and 84 causing current to flow through the speaker windings 74 and 76 thereby resulting in sound output from the speakers 78 and 80. For the lateral signal components the impedance means 79 has little effect since very little of the lateral signal component current flows therethrough. However, the vertical signal components are in parallel, and cause the terminals 82 and 84 to go in the same polarity direction at the same time. Thus there is no potential difference between the terminals 82 and 84, so that if the impedance means 79 is an open circuit, no current flows through the speaker windings 74 and 76 due to the vertical signal components.

On the other hand, if the impedance means 79 presents zero impedance to signal frequencies, all of the vertical signal component currents will flow in the speaker windings 74 and 76 and thereby produce sound from the speakers 78 and 80. In order to attenuate the low frequency vertical signal component response, and the low frequency noise signals which may be imposed thereon, the impedance means 79 includes a capacitor 86. In like manner, the high frequency vertical signal component response which contains the distortion products caused by the vertical recording process, may be eliminated by an inductor 88 which is shown connected in series with the capacitor 86. If desired, a circuit including both the capacitor 86 and the inductor 88 may be damped by a resistor (not shown) in accordance with well known techniques to produce the desired attenuation characteristics.

Although the impedance means 79 is shown comprising the series connection of a capacitor 86 and inductor 88, either of these elements may be used alone, or other frequency responsive impedance networks may be used without departing from the scope of the invention.

In FIGURE 6, the transducing elements 10 and 12 are connected in a manner that the vertical signal components are presented to the terminals 32 and 28 in push-pull relation, whereby the terminal 32 goes in a positive direction as the terminal 28 goes in the negative direction. On the other hand, as will be seen from a consideration of the stereophonic pickup shown in FIGURE 1, the lateral signals under these conditions will provide potentials at the terminals 28 and 32 which are going in the same polarity direction at the same time.

A resistor 90 is connected between the terminals 32 and 28 which together with the capacitive characteristic of the piezoelectric transducing elements 10 and 12 provides the desired frequency response characteristic for the vertical signal components. Considering the operation of this circuit, it will be seen that if the resistor 90 presents zero impedance between the terminals 32 and 28 then the amplifier tubes 42 and 46 will be responsive to amplify only the lateral signal components and not the vertical signal components. This is because the lateral signal components from the transducing elements 10 and 12 are developed across the resistors 48 and 50 respectively, which resistors are directly connected between the input electrodes and common electrodes of the amplifier tubes 42 and 46. However, with zero impedance between the terminals 28 and 32 the difference of potential normally produced between these terminals by the vertical signal components is shorted out. Thus no voltage due to the vertical signal components appears across resistors 48 and 50 for amplification through the amplifier tubes 42 and 46.

By properly selecting the resistance value of the resistor 90, the low frequency response of the coupling network to vertical signal components may be reduced. By way of example, the resistor 90 may be 500,000 ohms whereas the resistors 48 and 50 are 3 megohms. The attenuation for low frequency vertical signal components comes about as a result of the pickup or source impedance varying with frequency. It will be noted that the transducing elements 10 and 12 of the stereophonic pickup present capacitance as represented by the capacitors 10*a* and 12*a*. At low frequencies, the impedance presented by this capacitance is very high, and the loading as presented primarily by the resistor 90 causes a resultant relatively lower output. At higher frequencies the impedance as presented by the capacitors of the transducing elements is better matched with the impedance presented by the resistor 90, and therefore, the power transfer is more nearly optimized resulting in relatively larger signal output. In this manner the vertical signal component response is attenuated at lower frequencies, thereby also attenuating low frequency noise such as rumble.

FIGURE 7 is a circuit diagram of an amplifier for a stereophonic system illustrating a modification of the circuit shown in FIGURE 6. The transducing elements 10 and 12 are so phased that the vertical signal components are applied to the input electrodes of the tubes 42 and 46 in push-pull relation. The resistor 90 of FIGURE 6 is replaced by a network 91 including the parallel combination of an inductor 92, a resistor 94 and a capacitor 96. The damped resonant circuit formed by these elements in combination with the inherent effects of the other circuit elements including the capacitance provided by the transducing elements 10 and 12 and the resistance of the resistors 48 and 50, provides a sloping impedance vs. frequency characteristic having maximum impedance in the mid frequency range of the stereophonic signals and reduced impedance at the lower and higher frequency ends of the steophonic signal range.

The network 91 has substantially no effect on the lateral signal components as pointed out in connection with the description of FIGURE 6. However, the reduced impedance of the network 91 at low frequencies (including the range of rumble frequencies), and at high frequencies, causes attenuation of these portions of the vertical signal component frequency range relative to the mid range frequencies.

FIGURE 8 is a simplified schematic circuit diagram of a phonograph system recording apparatus for 45—45 stereophonic records. It is to be understood that the circuits of the invention are also applicable to the recording process. The separate stereophonically related signals are fed to the terminals 98, 99 and 99, 100. These signals are fed to the coils 102 and 104 respectively to drive the cutter 106. For equal amplitude in-phase signals fed to the coils 102 and 104, the cutter 106 moves vertically whereas for equal amplitude out-of-phase signals applied to the coils the cutter moves laterally. By reducing the amplitude of the low frequency and high frequency vertical signal components fed to the cutter, the lower and higher frequency vertical undulations on the groove of the resulting record are reduced thereby reducing the tracking difficulties and high frequency distortion problems attendant in the reproduction process. To this end the coils may be driven by circuits which may be designed in accordance with the principles described in connection with FIGURES 2, 4, 5, 6 and 7. For example, the transducing elements 10 and 12 of FIGURES 2, 4, 6 and 7 may comprise microphones to produce the two stereophonically related signals which are to be recorded, and the terminals 98 and 100 of the recorder may be connected with the anodes of the tubes 42 and 46 respectively whereas the terminal 99 is connected through ground to the junction of the resistors 52 and 54. In the circuit of FIGURE 5, the terminals 98 and 100 of the recorder may be connected with the terminals 82 and 84, and the terminal 99 with the right hand terminal of the inductor 88. In practice it may be desirable to include circuits of the type described in FIGURES 2 and 4 to 7 in one stage of a multistage amplifier for the recording apparatus.

It should be understood that in accordance with the teachings of the present invention the frequency response of lateral signal components may be attenuated relative to that of the vertical signal components. Furthermore, it should be understood that two or more of the frequency responsive impedance networks may be incorporated in the same stereophonic phonograph system to further enhance the attenuation of the signal components.

What is claimed is:

1. In a stereophonic phonograph system of the type for translating a pair of electrical signals each of which has components derived from the both lateral and vertical undulations of a record groove, a three terminal network having a first and second impedance elements connected in series, and a frequency responsive impedance element coupled to the junction of said first and second impedance elements in a manner that one of said electrical signals is adapted to be applied across the series combination of said first impedance element and said frequency responsive impedance element and the other of said electrical signals is adapted to be applied across the series combination of said second impedance element and said frequency responsive impedance element.

2. A coupling network for a sterephonic pickup of the type adapted to transduce a pair of stereophonically related recordings cut at substantially right angles to each other in the same groove of a phonograph record wherein each of said recordings is at an angle of substantially 45° with respect to the record surface and wherein said stereophonic phonograph pickup derives a pair of electrical signals corresponding to said pair of stereophonically related recordings comprising a first resistor and a second resistor connected in series, and a frequency responsive impedance element coupled to the junction of said first and second resistors, one of said electrical signals corresponding to one of said recordings adapted to be applied across the series combination of said first resistor and said frequency responsive impedance element and the other of said electrical signals corresponding to the other of said recordings adapted to be applied across the other series combination of the second resistor and said frequency responsive impedance element.

3. A coupling network as defined in claim 2 wherein said frequency responsive impedance element comprises a capacitor.

4. A coupling network as defined in claim 2 wherein said frequency responsive element comprises an inductor.

5. A coupling network as defined in claim 2 wherein said frequency responsive impedance element comprises a capacitor and an inductor in series.

6. An audio-frequency signal amplifier for stereophonic phonograph recording and reproducing systems for records having a pair of stereophonically related recordings in the same record groove, comprising in a combination, a pair of channel amplifying stages each including an input circuit and an output circuit, means for applying electrical signals corresponding to one of the recordings to the input circuit of one of said amplifying stages and for applying other electrical signals corresponding to the other of said recordings to the input circuit of the other of said amplifying stages, and frequency responsive impedance means connected in common to said input circuits and said output circuits for attenuating selected like components of said signals in both channels of said amplifier.

7. An audio-frequency signal amplifier for stereophonic phonograph recording and reproducing systems for records having a pair of stereophonically related recordings in the same record groove at substantially the same angle with respect to the record surface, said system including a stereophonic phonograph pickup for deriving a pair of stereophonically related signals corresponding to said pair of stereophonically related recordings, comprising in combination, a pair of amplifying devices each including an input electrode, an output electrode and a common electrode, means for applying one of said signals between the input electrode and common electrode of one of said amplifying devices and for applying the other of said signals between the input electrode and common electrode of the other of said amplifying devices, a pair of signal output circuits connected one with each output electrode of said amplifying devices, and frequency responsive impedance means providing a common circiut connection for said amplifying devices with one of said signal output circuits and said signal applying means for attenuating one of the vertical and lateral signal components corresponding respectively to the vertical and lateral record groove undulations substantially to the exclusion of the other.

8. An amplifying system as defined in claim 7 wherein said frequency-responsive impedance means comprises a resistor and a capacitor in parallel.

9. An amplifying system as defined in claim 7 wherein said frequency responsive impedance means comprises a resistor in parallel with the series combination of an inductor and a capacitor.

10. An amplifying system as defined in claim 7 wherein said frequency responsive impedance means comprises a resistor in parallel with an inductor.

11. A stereophonic phonograph system for use with records of the type having stereophonically related recordings cut at substantially right angles to each other in the same record groove with each being at an angle of substantially 45° with respect to the record surface, a stereophonic phonograph pickup for deriving a pair of electrical signals corresponding to said pair of stereophonically related recordings, a pair of amplifying devices each including a signal input circuit and a signal output circuit, means for applying one of said electrical signals to one of said signal input circuits and the other of said electrical signals to the other of said signal input circuits, means providing a pair of sound reproducing systems each providing a load impedance, means connecting said load impedances in series, and frequency responsive impedance means connected to the junction of said load impedances, and means for applying signals from one of said output circuits across the series combination of said frequency responsive impedance means and one of said load impedances and signals from the other of said output circuits across the series combination of said frequency responsive impedance means and the other of said load impedances.

12. An amplifying system as defined in claim 11 wherein said frequency responsive impedance means comprises the series combination of an inductor and a capacitor.

13. An amplifier for a stereophonic phonograph system for records having a pair of stereophonically-related recordings in the same record groove and at substantially the same angle with respect to the record surface, said system including a stereophonic phonograph pickup for deriving a pair of electrical signals corresponding to said pair of stereophonically-related recordings comprising in combination, a pair of amplifying devices each including an input electrode, an output electrode and a common electrode, means for applying one of said electrical signals between the input electrode and common electrode of one of said amplifying devices and for applying the other of said electrical signals between input electrode and common electrode of the other of said amplifying devices, first and second resistors connected between the output electrodes of said amplifying devices, operating potential supply means for said amplifying devices, a third resistor connected between the junction of said first and second resistors and a terminal of said operating potential supply means, frequency-responsive impedance means connected between the junction of said first and second resistors and the other terminal of said operating potential supply means for partially bypassing signals appearing across said third resistor, and means connecting said other terminal of said operating potential supply partially bypassed resistor means with the common electrodes of said amplifying devices.

14. An amplifier for a stereophonic phonograph system for use with records of the type having a pair of stereophonically-related recordings in the same record groove and at substantially the same angle with respect to the record surface, said system including a stereophonic phonograph pickup for deriving a pair of electrical signals corresponding to said pair of stereophonically-related recordings comprising in combination, a pair of amplifying devices each including an input electrode, an output electrode and a common electrode, means for applying one of said electrical signals between the input electrode and common electrode of one of said amplifying devices and for applying the other of said electrical signals between input electrode and common electrode of the other of said amplifying devices, first and second resistors connected between the output electrodes of said amplifying devices, operating potential supply means for said amplifying devices, a third resistor connected between the junction of said first and second resistors and a terminal of said operating potential supply means, a capacitor connected between the junction of said first and second resistors and the other terminal of said operating potential supply means for bypassing high frequency signals appearing across said third resistor, and a fourth resistor and a capacitor in parallel connecting said other terminal of said operating potential supply means with the common electrodes of said amplifying devices for bypassing high frequency signals appearing across said fourth resistor.

15. In a stereophonic phonograph system for use with records of the type having a pair of stereophonically related recordings cut in the same record groove with each being at substantially the same angle with respect to the record surface, and including a stereophonic phonograph pickup including piezoelectric transducers for deriving a pair of electrical signals corresponding to said recordings comprising a pair of resistors connected in series, means for applying one of said electrical signals across each of said resistors, a third resistor connected in parallel with the series combination of said pair of resistors and having a resistance proportioned to provide substantial loading of said piezoelectric transducing elements for low frequency components of said electrical signals appearing in push-pull relation across the series combination of said pair of resistors.

16. In a stereophonic phonograph system for use with records of the type having stereophonically-related recordings in the same record groove, a stereophonic phonograph pickup for deriving a pair of electrical signals corresponding to said pair of stereophonically related recordings, a pair of amplifiers each including an amplifying device having an input electrode, a common electrode and an output electrode, a resistor connected between the common electrodes of said devices and ground for said amplifiers, a capacitor connected in parallel with said resistor providing relatively high impedance for low-frequency signals of a frequency corresponding to rumble and substantially lower impedance for higher-frequency signals, means for applying one of said electrical signals between the input electrode of one of said devices and ground for said amplifier, means for applying the other of said electrical signals between the input electrode of the other of said devices and ground for said amplifier, and an output circuit for each of said amplifiers effectively connected between the respective output electrodes and ground.

17. In a stereophonic phonograph system for use with records of the type having a pair of stereophonically related recordings cut in the same record groove with each being at substantially the same angle with respect to the record surface, and means including a stereophonic phonograph pickup including piezoelectric transducers for deriving a pair of electrical signals corresponding to said recordings comprising a pair of impedance devices connected in series, means for applying one of said signals across each of said impedance devices, a frequency responsive impedance circuit connected in parallel with the series combination of said pair of impedance devices to provide attenuation of signal voltages appearing thereacross in accordance with the frequency vs. impedance characteristic of said frequency responsive impedance element.

18. In a stereophonic signal-translating system for records having a pair of stereophonically-related recordings in the same record groove and at substantially the same angle with respect to the record surface and wherein vertical groove undulations correspond to substantially equal amplitude recordings of one phase and lateral groove undulations correspond to substantially equal amplitude recordings of the opposite phase, means providing two signal amplifying channels having a common signal-conveying circuit, and frequency-responsive means connected in said common circuit network for attenuating signal components resulting from one of said lateral and vertical groove undulations to the substantial exclusion of the other.

19. In a stereophonic signal-translating system for phonograph records having a pair of stereophonically-related recordings in the same record groove and at the same angle to the record surface, a signal-translating circuit network having first, second and third terminals, said first and second terminals coupled to a source of signals corresponding to one of said recordings and said second and third terminals coupled to a source of signals corresponding to the other of said recordings, first and second signal conveying circuits coupled between said first and second terminals and said second and third terminals respectively, and frequency responsive impedance means connected to provide a common circuit path for signal currents applied to said first and third terminals, said frequency-responsive impedance means having a frequency vs. impedance characteristic to provide attenuation of like components of applied signals corresponding to said stereophonically-related recordings.

20. In a stereophonic signal-translating system for records having a pair of stereophonically-related recordings in the same record groove and at substantially the same angle with respect to the record surface and wherein vertical groove undulations correspond to substantial equal amplitude recordings of one phase and lateral groove undulations corresopnd to substantially equal amplitude recordings of the opposite phase, a two-channel signal amplifier having first, second and third signal input terminals, said first and second terminals adapted to be coupled to a source of signals corresponding to one of said recordings and said second and third terminals adapted to be coupled to a source of signals corresponding to the other of said recordings, means interconnecting said terminals for providing a first signal path between said first and third terminals for signals corresponding to equal amplitude recordings of opposite phase as applied to the first and second, and second and third terminals respectively, means providing a second signal path in common between each of said first and third terminals, said second terminal for equal amplitude recordings of the same phase as applied between the first and second, and second and third terminals respectively, and signal attenuating means connected individually in one of said first and second signal paths for controlling the relative response of said system to signal components corresponding to vertical and lateral groove undulations.

21. A stereophonic signal transmission system for two stereophonically-related signals each comprising first and second quadrature components, comprising, an amplifier circuit including two amplifier devices, means to apply said signals to said two amplifier devices such that the first of said components of said signals is applied to each of said amplifier devices in the same phase and the second of said components of said signals is applied to each of said amplifier devices in opposite phase, and frequency-responsive impedance means connected in common to said amplifier devices for frequency-selective attenuation of one of said first and second quadrature components.

22. In a stereophonic signal translating system for a pair of stereophonically-related audio-frequency signals each of which has vertical and lateral signal components corresponding to vertical and lateral undulations of a 45—45 two-channel stereophonic record groove, the combination of, a stereophonic phonograph-record transducer device including a single stylus element and a pair of electro-mechanical transducer elements connected with said stylus element for translating said stereophonically-related signals, a two-channel signal amplifier connected with said transducer elements providing individual translating circuits for said signals, and means including a signal-conveying circuit connection common to both amplifier channels for attenuating one of said signal components to the substantial exclusion of the other.

23. In a stereophonic signal translating system for a pair of stereophonically-related audio-frequency signals each of which has vertical and lateral signal components corresponding to vertical and lateral undulations of a 45—45 two-channel stereophonic record groove, the combination of, a stereophonic phonograph pickup having a stylus element for engaging said record groove and a pair of electro-mechanical transducer elements positioned relative to and connected with said stylus element for translating said stereophonically-related signals from said record groove, a two-channel signal amplifier having individual signal translating circuits connected with said transducer elements at one end, a pair of signal translating output devices coupled to said circuits at the opposite end, means providing a signal-conveying path for one of the vertical and lateral signal components connected in common to said signal translating circuits between said transducer elements and said signal output devices, and impedance means in said path for attenuating said one signal component, to the substantial exclusion of the other.

24. An audio-frequency signal amplifier for stereophonic phonograph recording and reproducing systems for records having a pair of stereophonically-related recordings in the same record groove, comprising in combination, a pair of channel amplifying stages each including an input circuit and an output circuit, means for applying electrical signals corresponding to one of the recordings in said record groove to the input circuit of one of said amplifying stages and for applying other electrical signals corresponding to the other of said recordings in said record groove to the input circuit of the other of said amplifying stages, impedance means connected in common to one of said input circuits and said output circuits for attenuating selected like components of said signals in both channels of said amplifier, and electro-mechanical stereophonic signal-translating means connected with said output circuits for operation by said amplifier in response to said applied signals.

25. A stereophonic phonograph comprising an essentially horizontal record turntable, a first means for converting electrical impulses into sound including an electroacoustical transducing device having an input, a second means for converting electrical impulses into sound including a second electroacoustical transducing device having an input, a pickup having a first output connected to the input of the first electroacoustical device and a second output connected to the input of the second electroacoustical device, and means connected to the two devices for cancelling the response of the pickup to vertical displacement components below a frequency of 800 cycles per second.

26. An amplifier system comprising two amplifiers respectively having an input connected to one and the other channel of a stereo sound system and an output connected to a speaker for reproducing the sound of its channel, the amplifier inputs each having a circuit to ground including a common cathode resistor for cross coupling from one amplifier to the other.

27. An amplifier system comprising two amplifiers respectively having an input connected to one and the other channel of a stereo sound system and an output connected to a speaker for reproducing the sound of its channel, means for feeding back to both amplifier inputs a negative signal proportional to the sum of the amplifier outputs.

28. An amplifying system comprising two amplifiers respectively having an input connected to one and the other channel of a stereo sound system and an output connected to a speaker for reproducing the sound of its channel, said amplifiers respectively including an amplifying device having input, output and common electrodes with the output and common electrodes defining a current path in said device, the amplifier input circuits respectively connected to said input electrodes of the amplifying devices for each channel and including common resistance means interconnecting the common electrodes of the amplifying devices, said resistance means being in the current path of said devices for cross-coupling from one amplifier to the other.

References Cited by the Examiner

UNITED STATES PATENTS

| | | | |
|---|---|---|---|
| 2,014,528 | 9/1935 | Keller | 179—100.41 |
| 2,093,540 | 9/1937 | Blumlein | 179—100.41 |
| 2,114,471 | 4/1938 | Keller et al. | 179—100.41 |
| 2,115,854 | 5/1938 | Hofer | 330—134 |
| 2,571,223 | 10/1951 | Edinburg | 330—123 |
| 2,713,620 | 7/1955 | Tilley | 330—118 |
| 2,775,460 | 12/1956 | Shivack | 179—100.41 |
| 2,846,519 | 8/1958 | Morrell | 179—100.4 |
| 2,898,410 | 8/1959 | Brooks | 330—123 |
| 2,931,986 | 4/1960 | Ensink | 330—15 |

FOREIGN PATENTS 480,994 3/1938 Great Britain.

OTHER REFERENCES

Pages 17 and 44, April 1952, publication: "A Twin-Channel Utility Amplifier" by R. S. Houston in Audio Engineering, vol. 36–4.

IRVING L. SRAGOW, *Primary Examiner.*

L. MILLER ANDRUS, ROBERT H. ROSE, NEWTON N. LOVEWELL, *Examiners.*

UNITED STATES PATENT OFFICE

CERTIFICATE OF CORRECTION

Patent No. 3,225,146 December 21, 1965

John A. Tourtellot

It is hereby certified that error appears in the above numbered patent requiring correction and that the said Letters Patent should read as corrected below.

Column 6, line 54, for "hgiher" read -- higher --; column 11, lines 6 and 7, strike out "partially bypassed resistor" and insert the same after "and" in line 5, same column 11.

Signed and sealed this 13th day of December 1966.

(SEAL)
Attest:

ERNEST W. SWIDER
Attesting Officer

EDWARD J. BRENNER
Commissioner of Patents